US007775184B2

(12) United States Patent
Zak et al.

(10) Patent No.: US 7,775,184 B2
(45) Date of Patent: Aug. 17, 2010

(54) DEFORMABLE CHAMBER-BASED HOMOGENEOUS CHARGE COMBUSTION IGNITION (HCCI) ENGINE AND GENERATOR

(76) Inventors: Robert C. Zak, 133 Wilder Rd., Bolton, MA (US) 01740; Jon P. Wade, 6965 Eagle Peak Rd., Reno, NV (US) 89519

( * ) Notice: Subject to any disclaimer, the term of this patent is extended or adjusted under 35 U.S.C. 154(b) by 284 days.

(21) Appl. No.: 12/082,325

(22) Filed: Apr. 11, 2008

(65) Prior Publication Data

US 2009/0255513 A1 Oct. 15, 2009

(51) Int. Cl.
*F02B 71/00* (2006.01)
(52) U.S. Cl. .................... 123/46 E; 123/27 R
(58) Field of Classification Search ........... 123/46 R, 123/46 E, 46 SC, 27 R
See application file for complete search history.

(56) References Cited

U.S. PATENT DOCUMENTS

| 2,966,148 | A | 12/1960 | Jarret |
| 3,112,060 | A | 11/1963 | Ollier |
| 3,234,395 | A | 2/1966 | Colgate |
| 4,154,200 | A | 5/1979 | Jarret |
| 4,480,599 | A | 11/1984 | Allais |
| 5,222,466 | A | 6/1993 | Gratziani |
| 5,893,343 | A | 4/1999 | Rigazzi |
| 5,932,940 | A | 8/1999 | Epstein |
| 6,193,501 | B1 | 2/2001 | Masel |
| 6,276,313 | B1 | 8/2001 | Yang |
| 6,349,686 | B1 | 2/2002 | Annen |
| 6,392,313 | B1 | 5/2002 | Epstein |
| 6,397,793 | B2 | 6/2002 | Yang |
| 6,945,202 | B2 * | 9/2005 | Kaneko et al. ............ 123/46 R |

OTHER PUBLICATIONS

U.S. Appl. No. 11/289,059, filed Nov. 29, 2005, Wade, Jon P.

* cited by examiner

Primary Examiner—Noah Kamen

(57) ABSTRACT

A reciprocating internal combustion engine is based on Homogenous Charge Compression Ignition (HCCI) that occurs in a deformable, resonant combustion chamber and that is coupled mechanically to efficient, resonant, electromechanical transducers acting as motors and generators. The mechanical coupling also implements fuel/air intake valves and exhaust valves. Embedded sensors allow an electronic control system to start the engine and thereafter to maintain operational configuration of the moving components in response to the effects of imperfect mechanical fabrication and/or assembly and dynamic changes in mechanical properties of the materials with run-time temperature and engine life.

10 Claims, 9 Drawing Sheets

Engine/Generator Cross Section

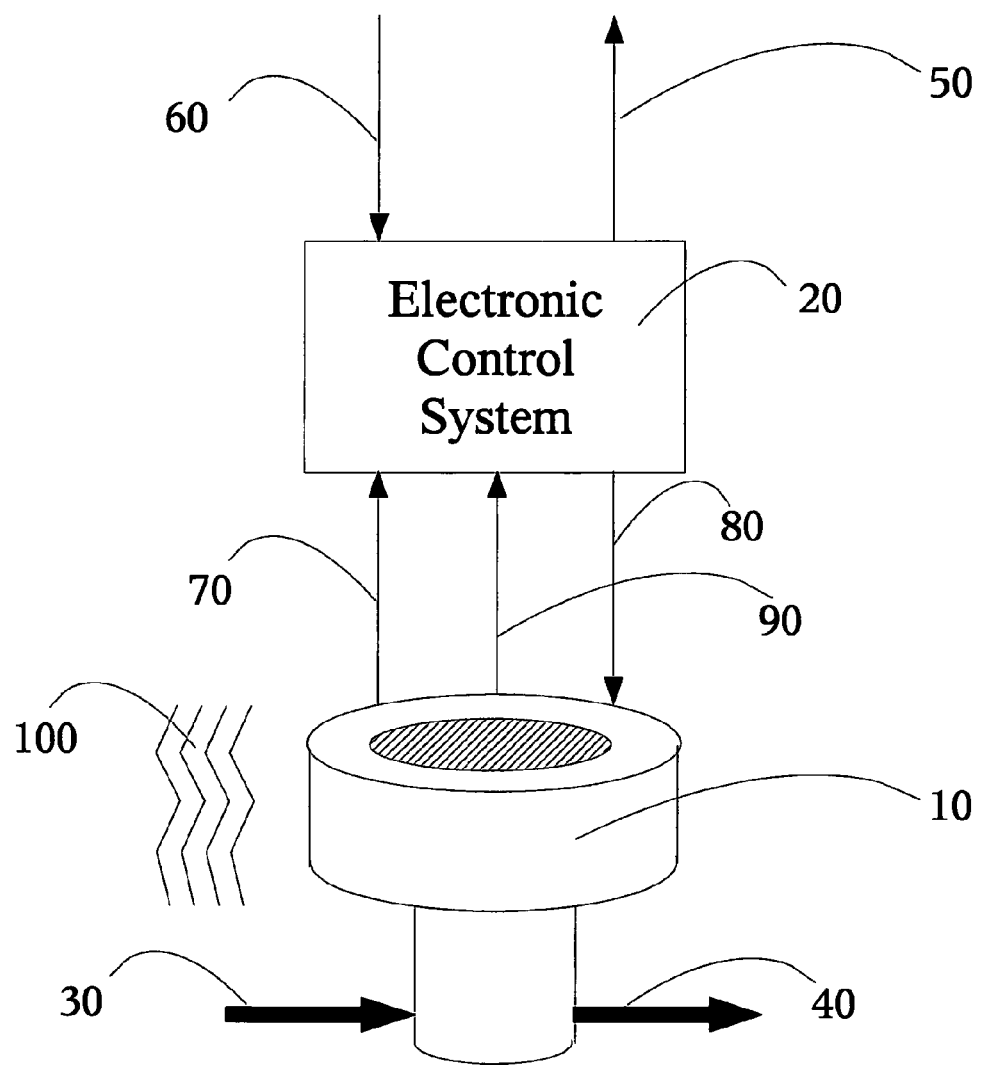
Fig. 1    Integrated Engine/Generator System

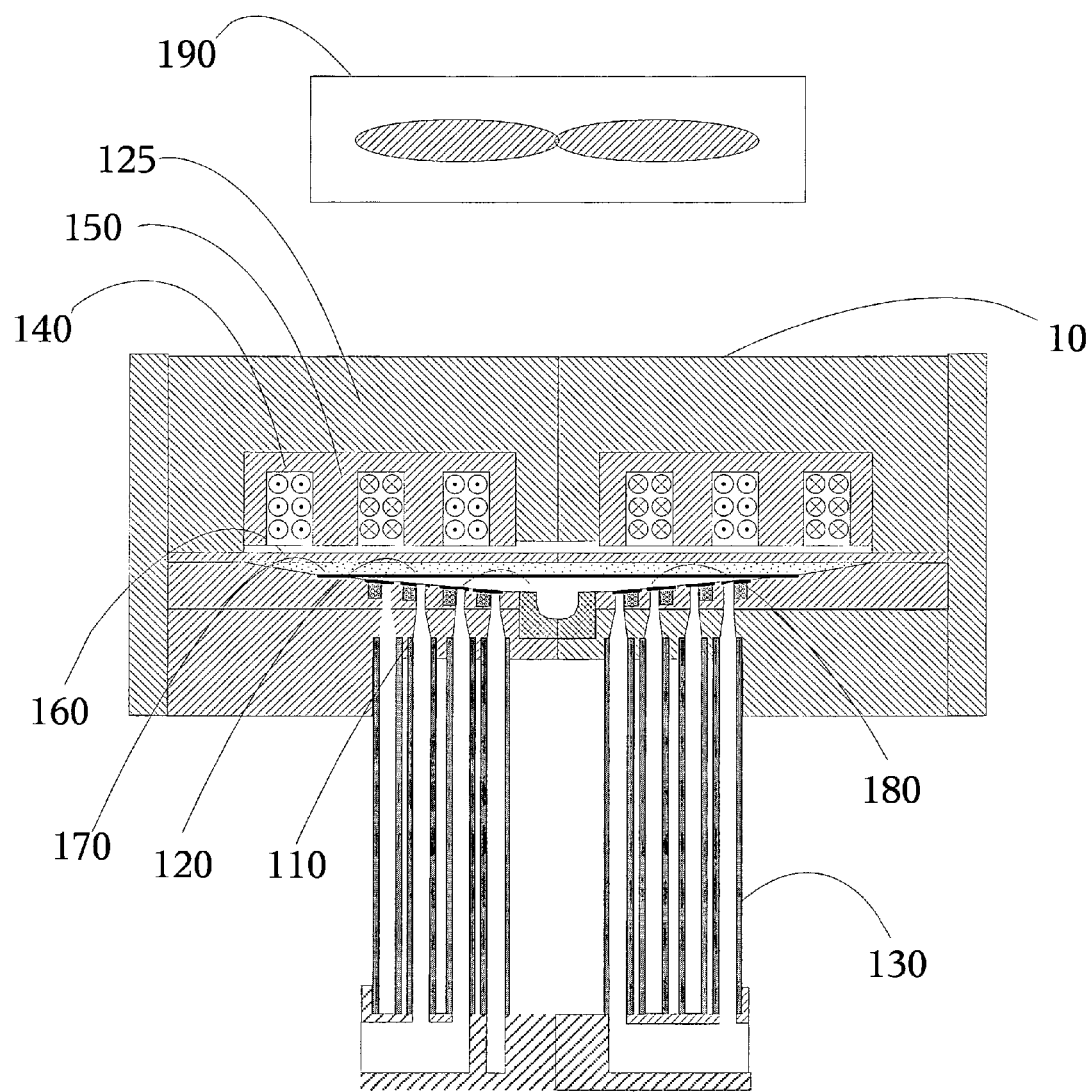
Fig. 2  Engine/Generator Cross Section

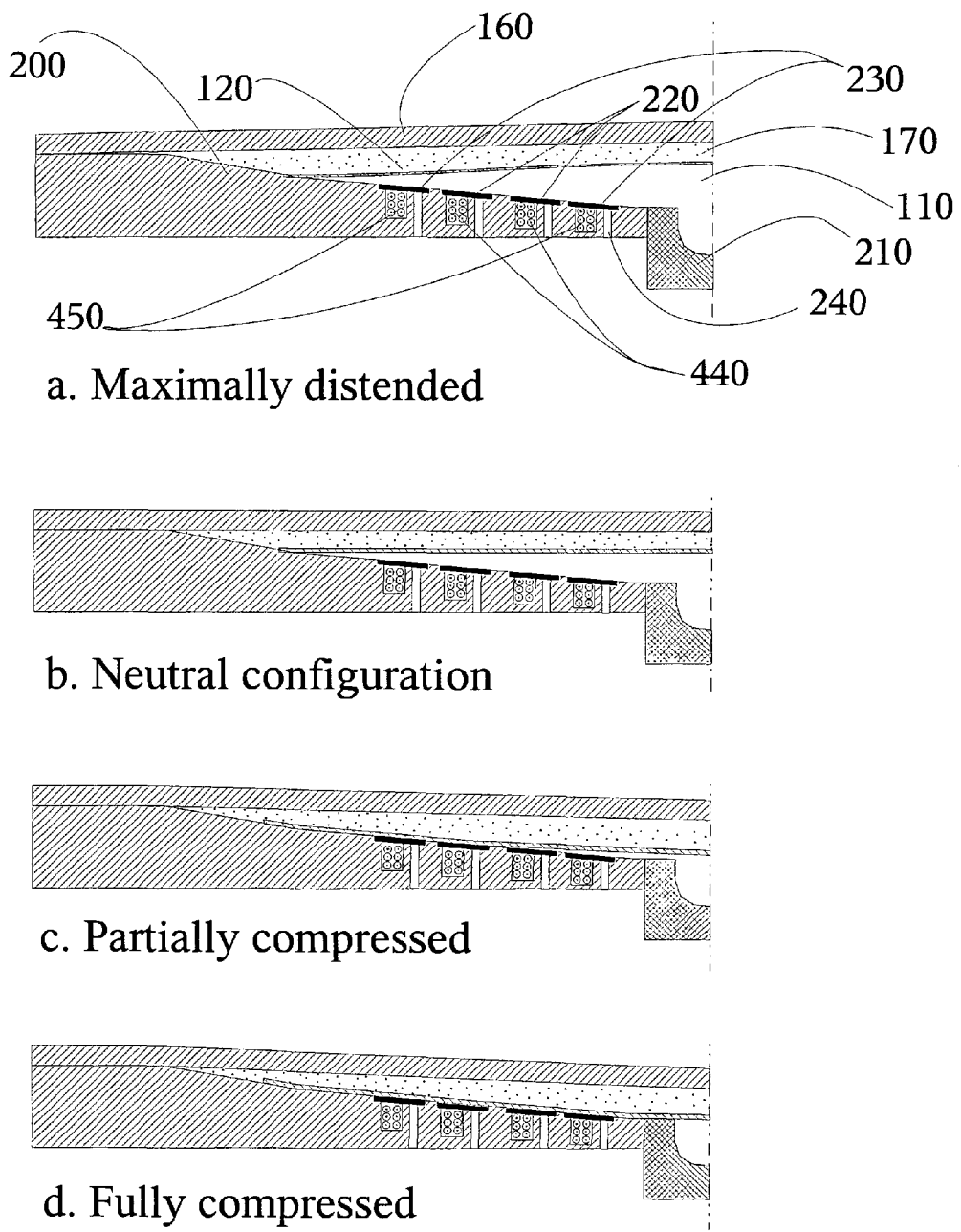
a. Maximally distended
b. Neutral configuration
c. Partially compressed
d. Fully compressed
Fig. 3 Combustion Chamber Operation
(note that generator is rotationally symmetric about the centerline)

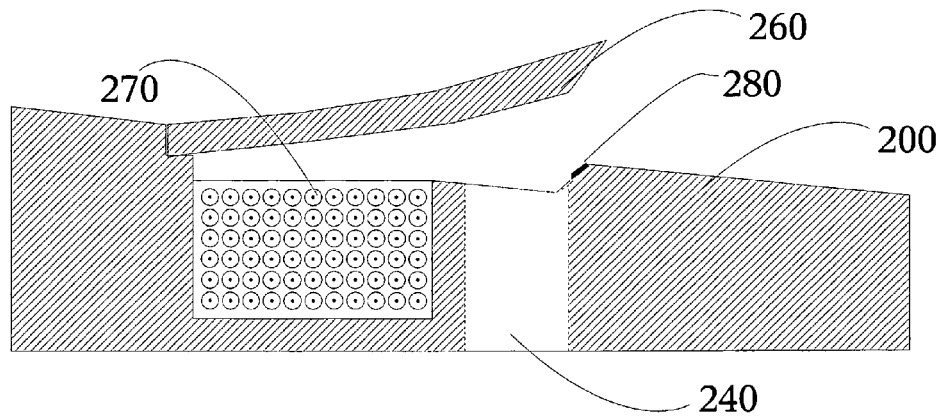
a. Valve maximally open
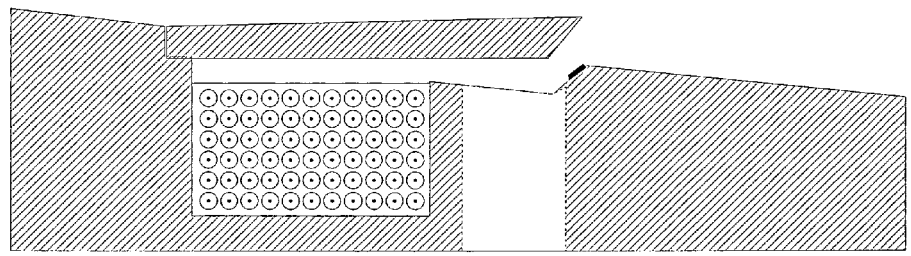
b. Valve in neutral configuration
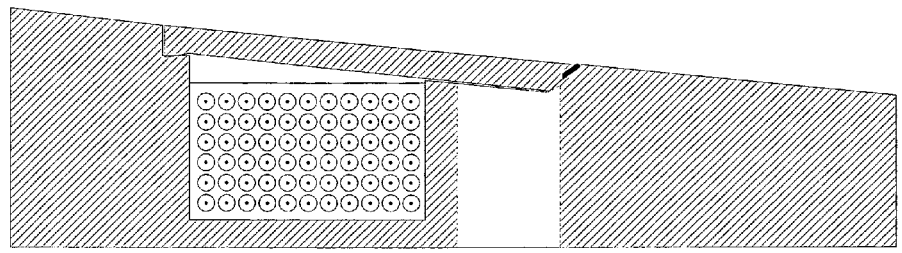
c. Valve Fully Closed
Fig. 4   Valve and Valve Operation
(note that drawing a cross section of rotationally symmetric annular valve)

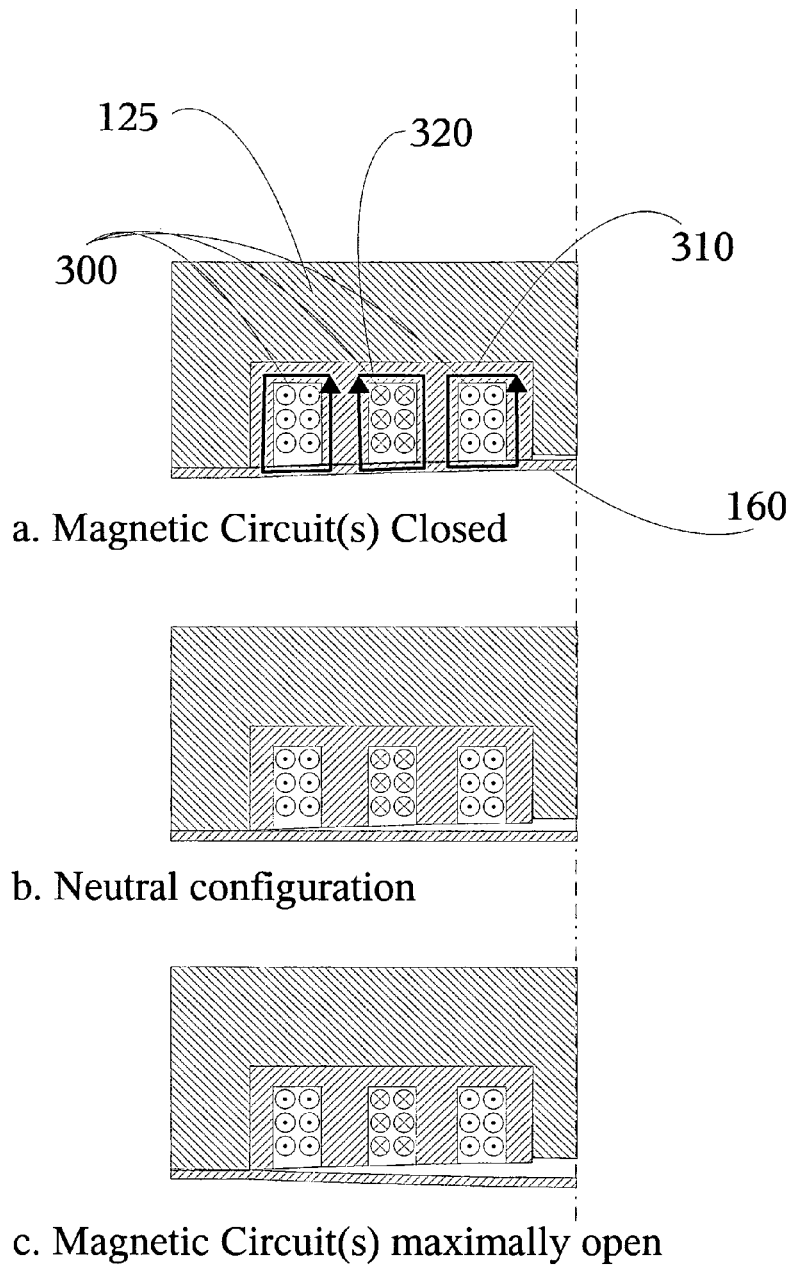
Fig. 5 Switched Reluctance Motor/Generator
(note that generator is rotationally symmetric about the centerline)

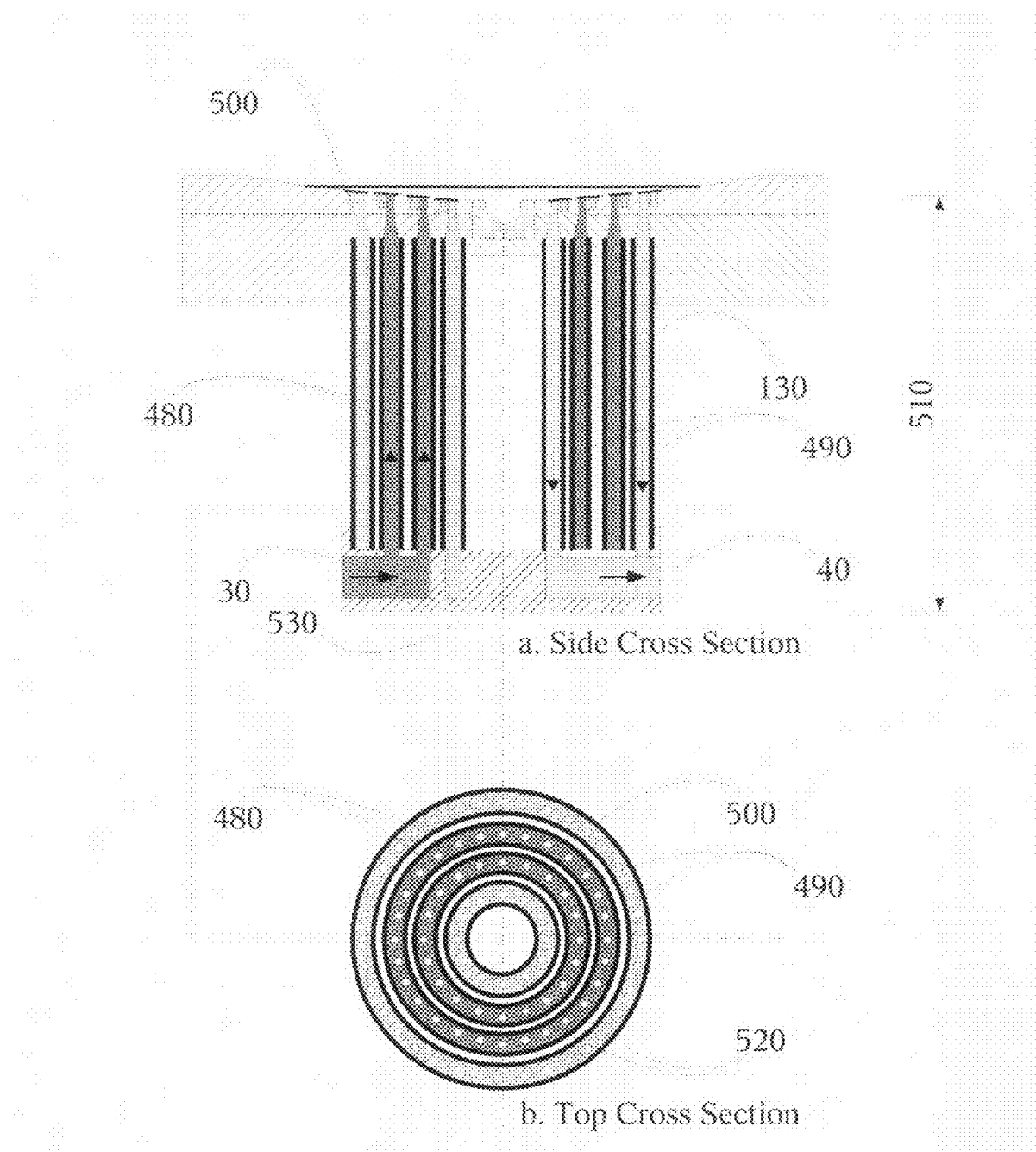
Fig. 6 Tuned Intake and Exhaust Manifolds

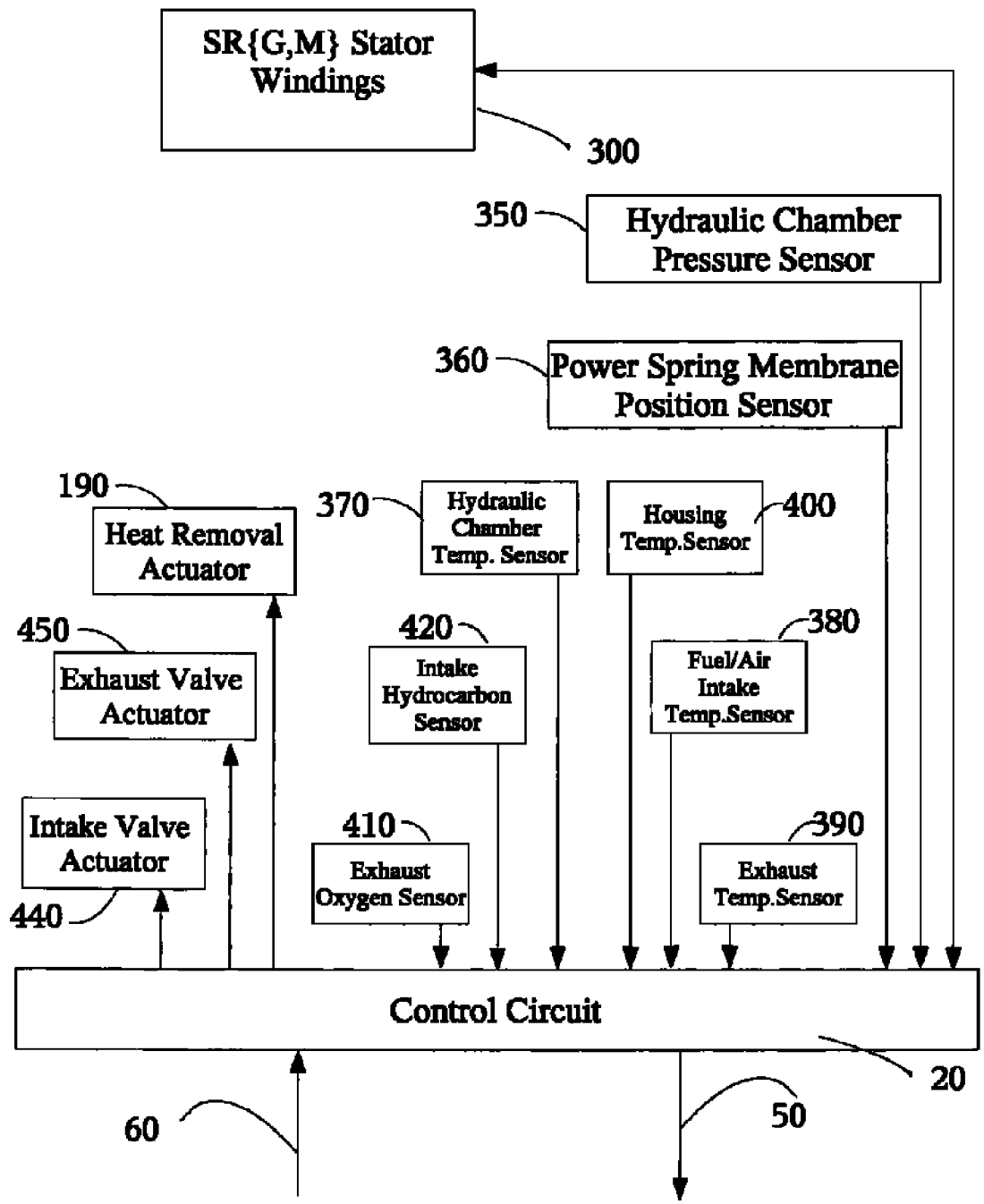
Fig. 7 Sensor and Actuator Block Diagram

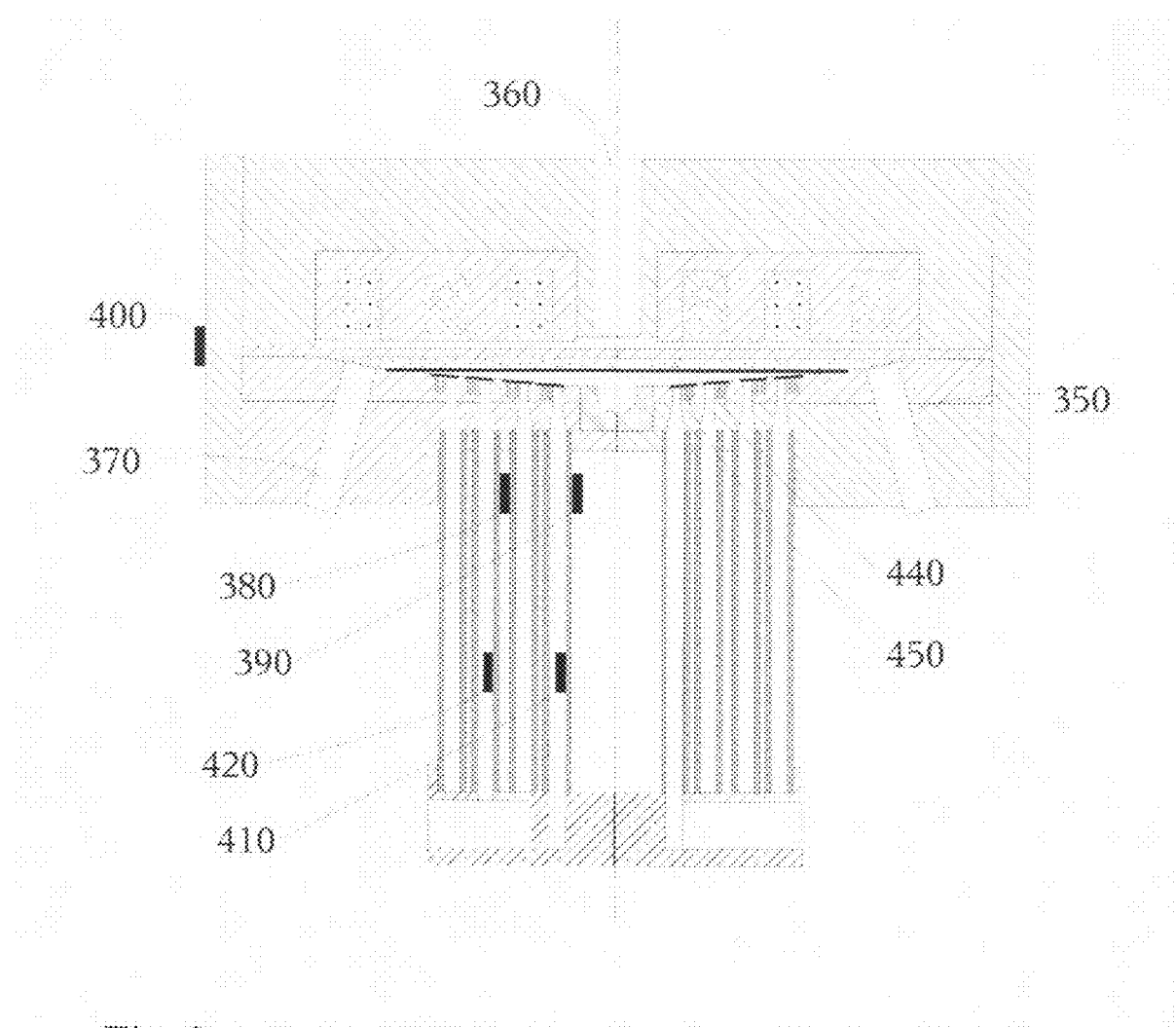
Fig. 8  Embedded Sensor Implementation Detail
(in cross section)

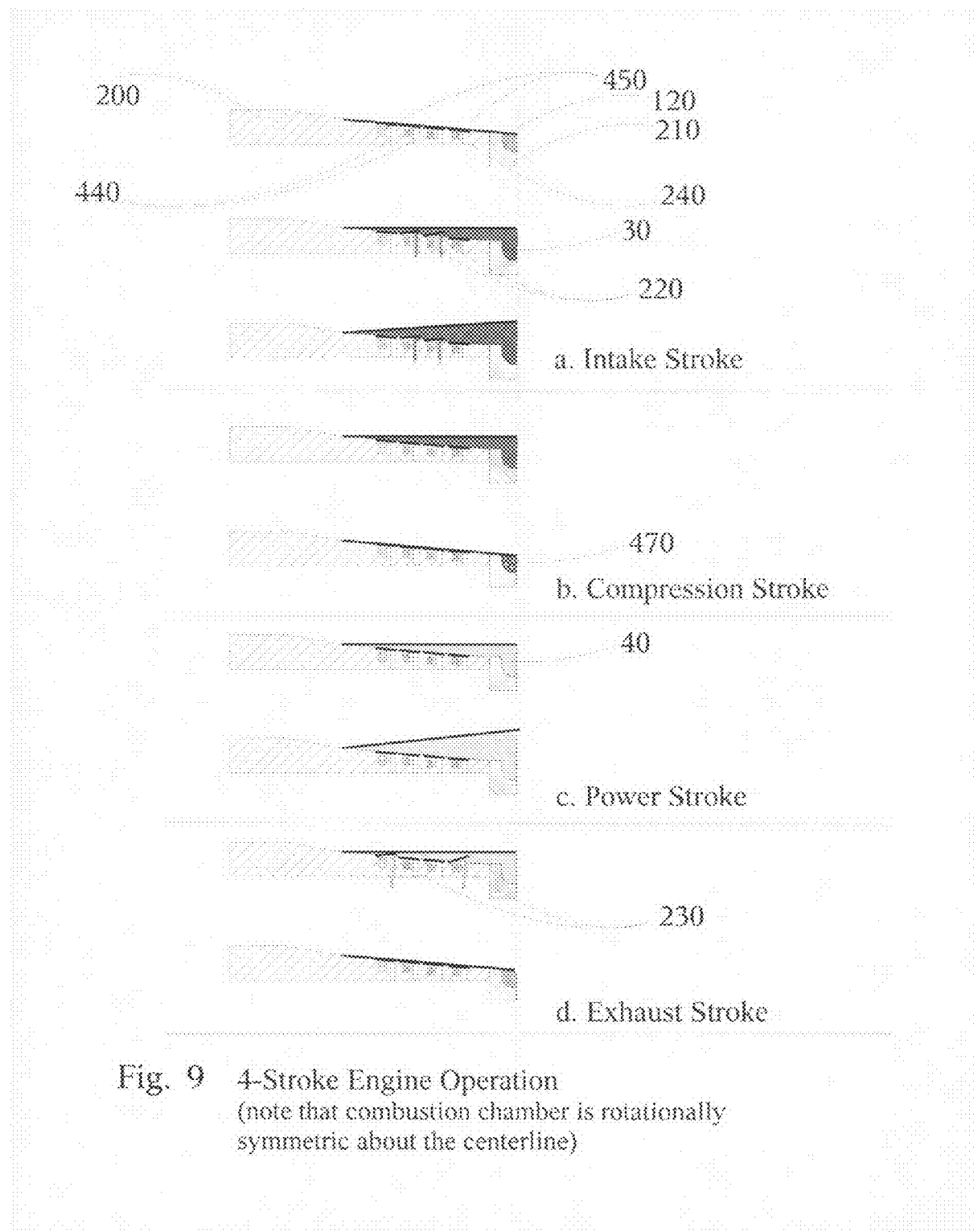
Fig. 9 4-Stroke Engine Operation
(note that combustion chamber is rotationally symmetric about the centerline)

DEFORMABLE CHAMBER-BASED HOMOGENEOUS CHARGE COMBUSTION IGNITION (HCCI) ENGINE AND GENERATOR

BACKGROUND

There is a global need for clean, efficient, inexpensive, reliable power generation. These systems have power requirements that range from milliwatts to hundreds of kilowatts, and include systems from small embedded sensors to motor vehicle power systems. Currently, these power requirements are addressed by a range of technologies that includes electro-chemical batteries, photovoltaic cells, thermoelectric generators, fuel cells, and internal and external combustion engines. These solutions, however, are oftentimes insufficient in a number of important aspects, including a low energy density (electro-chemical batteries), a dependency on an external primary energy source (photovoltaic and thermoelectric generators), high cost and complexity (fuel cells and Stirling engines), high maintenance (internal combustion engines) and high emissions (diesel and spark ignition internal combustion engines).

Internal combustion engines are the one of the most widely used sources for portable power generation. The most common form are Otto and Diesel cycle reciprocating engines which consist of a rigid combustion chamber within which combustion is initiated which then drives the displacement of a rigid piston. This piston is then coupled to a mechanical-electrical transducer which provides the electrical output. In spark ignition engines, the combustion is initiated by a spark or glow plug, while in diesel engines combustion is initiated through the compression of a gas into which fuel is injected.

There are a number of inherent disadvantages in the commonly used rigid combustion chamber and piston design. First, a tight, low friction seal must be maintained between the rigid combustion chamber and piston in a hostile environment which includes high temperatures, high pressure spikes, high vibration, abrasive chemicals and contamination. Satisfying these requirements often depends on special seals, close mechanical tolerances and high performance lubrication. Generally, the operational life of the generator system is determined by the compliance of these seals. As a result, the need to periodically change the lubricant incurs the inconvenience and expense of regular maintenance.

Second, the mass of the engine is dictated by the need to withstand and contain the explosive force and heat of combustion. This is typically achieved through the use of a combustion chamber bore out of a large piece of metal, accompanied by a piston constructed of a large, solid piece of metal. In addition to the increased mass of the system, there is a loss of overall system efficiency due to the need to move the pistons, and in the case of reciprocating engines, reverse its direction. Finally, the operational speed of the system is limited by the strength of the materials that move the piston assembly. Reducing the operational frequency results in larger combustion chambers and piston for a given output power, and, thus, heavier engines.

Third, the operational temperature of the system is often limited by the material used in the construction of the rigid combustion chamber and piston to a lower range than is desired for maximum efficiency and the reduction of resulting pollutants. In addition, seal friction and leakage also contribute to engine inefficiency and the increased emission of pollutants.

Fourth, the combustion chamber and piston assembly must be manufactured to close tolerances to provide a low friction, low-leakage seal which increases the cost to manufacture the engine.

This invention relates to devices for generating electrical power from the controlled combustion of fuels using Homogeneous Charge Combustion Ignition (HCCI) which avoids the need for a rigid combustion chamber and piston.

Increasing the frequency of the combustion process reduces the energy released per combustion which can be used to reduce the overall mass of the combustion system. However, the speed of spark and diesel-based combustion poses a limit on the overall operational speed of an engine. Homogenous Charge Combustion Ignition (HCCI) has been recognized as a new combustion mode for internal combustion engines which can operate at a much quicker rate. In addition, by increasing the compression ratio and burning at lower temperatures, it can improve efficiency and reduce undesired emissions. HCCI relies upon a lean and well-mixed air-fuel mixture that is compressed. A resulting spontaneous burn produces a flameless energy release in a large zone almost simultaneously. This operation is very different from the spark/gasoline burn or the compression/diesel burn. HCCI can thus be a basis for an efficient engine, like a diesel engine, but without the $NO_x$ or particulate emissions of diesel.

It is a principal object of this invention to provide a system that is reliable, easily maintained and has a low weight as compared to similarly rated conventional rigid piston engines.

A further principal object is to provide an internal combustion system that can operate at higher combustion temperatures than are possible with conventional engines to increase the efficiency of the system and reduce the emission of environmentally harmful combustion products.

Another advantage of the present invention is that many of parts responding to the combustion do not have to be machined to close tolerances and can be formed, at least in part, from component materials that exhibit low densities, good wear and heat resistance, and have favorable costs of manufacture while providing the capability to scale the system down in power output.

Yet another advantage of the present invention is that it can be used with a variety of different fuels.

SUMMARY

In one embodiment, a reciprocating internal combustion engine is based on Homogenous Charge Compression Ignition (HCCI) of a high energy density fuel, including, but not limited to: liquid hydrocarbon fuels, e.g., gasoline, diesel fuel, propane, and butane; as well as hydrogen; and air mixture, that occurs in a deformable, combustion chamber and which is coupled hydraulically to an efficient, resonant, electromechanical transducer acting as motor and generator. The combustion chamber comprises a top, deformable combustion membrane which separates the combustion process from the hydraulic fluid. The bottom of the combustion membrane comprises a rigid valve plate assembly which includes both intake and exhaust valves, their actuation mechanism, and an optimally shaped cavity. In operation, the resonating power spring membrane applies varying pressure to the hydraulic fluid. The combustion membrane is pressed into the valve plate cavity by the hydraulic fluid as the pressure grows, and pulled out of the cavity as the pressure decreases. During the compression phase, the combustion membrane is pressed into the cavity, effectively reducing the volume in the combustion chamber, and thereby increasing the pressure and temperature of a homogenous air/fuel charge in the combustion chamber. Due to the special shape of the valve plate cavity, as the volume in the combustion chamber is reduced, the surface area exposed to the fuel/air mixture is also reduced, thereby significantly reducing heat loss through the relatively cool combustion chamber walls. Electronically actuated intake and exhaust valves embedded in the valve plate allow the combustion chamber to be filled with a homogenous fuel/air charge, and emptied of combustion products, respectively. The invention also includes a tuned intake and exhaust system, designed to reduce acoustic emissions.

One embodiment, described herein, includes embedded sensors that allow an electronic control system to start the engine and thereafter to maintain optimal operation of the engine in response to time varying environmental conditions (e.g. ambient temperature and air pressure), different fuels, different fuel formulations, the effects of imperfect mechanical fabrication and/or assembly, and dynamic changes in mechanical properties of the materials with run-time temperature and engine life.

One embodiment is amenable to millimeter scale fabrication techniques and can, therefore, be scaled down in size to meet 100-watt scale loads. In addition, larger versions and/or aggregations of multiple implementations can create systems capable of supplying large amounts of mobile electrical power based on readily available fuels.

BRIEF DESCRIPTION OF DRAWINGS

FIG. 1 shows a schematic of one embodiment of the present invention;

FIG. 2 shows the engine and generator in cross section;

FIG. 3 shows a more detailed cross section of the combustion chamber and its associated components, and operation;

FIG. 4 shows the operation of the intake and exhaust valves;

FIG. 5 shows the resonant power spring membrane and the switched reluctance motor/generator;

FIG. 6 shows the tuned intake and exhaust manifolds;

FIG. 7 shows a schematic diagram of the electronic control system and the embedded sensors;

FIG. 8 shows an embodiment of the physical placement of the system's embedded sensor;

FIG. 9 shows the intake, compression, power, and exhaust strokes of the engine from the perspective of the combustion chamber.

DETAILED DESCRIPTION

In the embodiment shown in FIG. 1, the system has two parts: an integrated engine and electromechanical transducers (acting as motor/generator) (10) coupled to an electronic control system (20). The engine consumes a fuel and air mixture (30) and produces exhaust (40) from combustion products. The electronic control system (10) receives sensor input from the engine (70). The details of the sensor input are described below, and include position, pressure and temperature sensors of various components in the engine. The electronic control system (20) also receives unregulated electrical output (90) from the generator which it uses to provide regulated electrical power (50) output. The electronic control system (20) also supplies signals (80) that control the electrical valve actuators and release excess heat (100) from the engine (10). An external power source (60) provides power for starting the engine.

When starting the engine, the electronic control system (20) applies power from an external electrical power source (60) to the electromechanical transducer, acting as a motor, to start the engine—i.e. to initiate self-sustaining combustion operation.

In one embodiment of the invention, to be discussed in more detail below, the electrical input from the control system drives the electromechanical transducer into resonance and the mechanical stimulus from the transducers drives the combustion chamber.

After the engine (10) has been started, as in FIG. 2, the HCCI in the deformable combustion chamber (110) drives the periodic expansion and contraction of the deformable combustion chamber, as in FIGS. 9a, 9b, 9c and 9d. The combustion chamber is hydraulically coupled, via a hydraulic fluid chamber (170) formed between the combustion chamber membrane (120) and the power spring membrane (160). The power spring membrane (160), in turn, is coupled, magnetically to the stator of the electromechanical transducer (150), which is held stationary by the stator housing (125). The combination of power spring membrane (160) and the stator unit (150) comprise a switched reluctance generator (140) which converts the mechanical energy of combustion to electrical energy. As in FIG. 2, the power spring membrane (160) provides a mechanical restoring force which repressurizes the combustion chamber (110) and thereby enables self-sustaining ignition of incoming fuel/air charge on the next cycle. As in FIG. 1, power in excess of that necessary to drive self-sustaining combustion is extracted via the electromechanical transducer by the electronic control system (20) and constitutes the raw electric power output (90) of the device. The electronic control system (20) controls the valve operation for the engine (10) to consume and combust the fuel/air mixture (30) and to expel exhaust gases (40). The electronic control system also maintains the thermal operating point of the engine by modulating the rate at which heat (100) is removed from the engine/generator via the heat removal actuator, which is described below.

In one embodiment, energy from the periodic combustion of the air/fuel mixture sustains the resonant oscillation of the combustion chamber and electromechanical transducers. This enables the engine to store energy over several cycles and enables operation as a 4-stroke engine in which HCCI occurs only on every other cycle of the combustion chamber.

In one embodiment of the invention, the electric transducer is a variable reluctance machine. Operating as a generator, this machine converts mechanical energy to electrical energy via a time varying reluctance in a magnetic circuit. Operating as a motor, this machine converts electrical energy to mechanical energy via a time varying drive current.

In one embodiment of the invention, the variable reluctance machine is a linear switched reluctance machine in which magnetic flux is generated via electrical current in a number of windings around a ferromagnetic stator; or, conversely, in which current in a number of windings in the stator is generated by magnetic flux in the magnetic circuit.

In one embodiment of the invention, the power spring membrane itself is made of a ferromagnetic material and acts as the movable element in the variable reluctance machine.

The integrated HCCI internal combustion engine and generator (10) is shown in FIG. 2. The engine (10) includes four parts, which, although integrated in the embodiment, are presented here separately for clarity. The engine (10) includes a deformable combustion chamber (110); a set of intake and exhaust valves (180); an electromechanical transducer (140); a resonant exhaust and intake system (130); and a heat removal actuator (190).

FIG. 3 shows an expanded drawing of the deformable combustion chamber (110), its associated elements, and operation. The chamber comprises an optimally shaped valve plate (200), and a flexible combustion chamber membrane (120). As shown in FIG. 3a, when driven by pressure from combustion within the chamber, the chamber deforms axially (in the direction of its height) upward, increasing in volume. As shown in FIG. 3d, when driven by pressure from the power spring membrane (via the hydraulic fluid) the chamber deforms axially downward, decreasing in volume. The difference between the maximum and minimum volume creates the compression necessary for HCCI. The shape of the valve plate is optimal in the following two ways. First, as the combustion membrane is pressed into the valve plate, the combustion membrane makes contact with the valve plate, thereby reducing the surface area exposed to the fuel/air mixture. Second, when the combustion membrane is maximally deflected, achieving the necessary compression ratio, the exposed volume, which will house the combustion itself, has a small surface area to volume ratio—approaching a sphere of the necessary volume. In one embodiment of the valve plate shape, the valve plate includes a "bowl"-shaped final combustion cavity (210) in the center in which the combustion itself takes place; and it includes a conical cross section in which the valve plate (200) walls slope upward from the final combustion cavity to the perimeter where it is attached to the combustion chamber membrane (120). The slope of the cone-shape is chosen such that the combustion membrane makes contact with the valve plate as it is pressed into the valve plate cavity. The specific dimensions are chosen based on the physical properties of the material, desired operating frequency, and desired power output. The material for the combustion chamber membrane (120) may include, but is not limited to: steel (and steel alloys), aluminum (and aluminum alloys), titanium (and titanium alloys), SiC, $Si_3N_4$, silicon (and other materials suitable for micromachining techniques). The table below summarizes an example design with a resonant frequency of approximately 1 kHz.

In one embodiment of the present invention, the combustion chamber is axially symmetric.

In one embodiment of the present invention, the final combustion cavity is lined with a heat insulating ceramic, such as TiN, $Al_2O_3$ or $ZrO_2$, or similar material, capable of withstanding high temperatures, large temperature gradients (e.g. between the combustion and the valve plate), and repeated thermal cycling. Without loss of generality with respect to the actual materials to achieve this function, this element is referred to as a "ceramic insert" herein.

In one embodiment of the present invention, the combustion chamber membrane is a flat membrane, secured around its perimeter to the valve plate by a weld, flange or by some other clamping mechanism.

In one embodiment of the present invention, the combustion chamber membrane includes one or more corrugations designed to increase axial deflection and reduce stress in the membrane itself.

The valve plate has at least one intake valve (220) and at least one exhaust valve (230), for admitting the homogenous fuel/air mixture into the combustion chamber, and expelling combustion byproducts, respectively.

In one embodiment of the invention, shown in FIG. 4, each intake and exhaust valve comprises an annular valve membrane (260), welded, or otherwise attached, to the valve plate (200) at its outer periphery, and shaped such that the annulus is normally deflected up, so as to allow fluid flow through valve holes (240) in the valve plate (200).

In one embodiment of the invention, shown in FIG. 4, the valve membranes (260) described above are fabricated from a ferromagnetic material, and are activated by magnetic flux through a magnetic circuit which includes the valve plate annulus. The magnetic flux is created electrically via valve actuator windings (270) embedded in the valve plate (200) itself. When the valve is actuated, the valve membrane is pulled toward the valve plate, thereby covering the holes in the valve plate and preventing fluid flow, as in FIG. 4c.

In one embodiment of the invention the thickness and width of the annular valve membranes are chosen such that they have a primary resonant frequency approximately twice that of the normal engine operating frequency. Thus, when released from the closed position, the valves tend to open, and then spring back towards closure of their own accord, thereby reducing the amount of mechanical work done by the valve actuator.

In one embodiment of the invention, shown in FIG. 4, the outer, sealing rim (280) of the valve plate (200) is coated with a very hard material, including but not limited to: TiN, $Al_2O_3$ or $ZrO_2$. The interface between the relatively soft valve membrane (260) and this much harder material (280) serves to better seal the valves.

As shown in FIG. 5, in one embodiment of this invention, the electromechanical transducer is implemented as a Switched Reluctance Motor/Generator. The power spring membrane, which is fabricated from ferromagnetic steel, serves as the "rotor" of the Switched Reluctance Motor/Generator (160). Windings (300) in the top housing (125) serve as the stator(s) for the motor/generator. By controlling the flow of current into, and extraction of current out of, the stator windings, it is well known how to operate such a machine as a motor (causing flexion of the power spring membrane), or as a generator (extracting power from the flexing power spring membrane).

The following description provides some detail on this switched reluctance embodiment. Electro-mechanical transducers can also be implemented using different configurations of piezoelectric material, electromagnetic or electrostatic motor/generators.

The electric transducer comprises a disk of ferromagnetic material. The ferromagnetic disk is attached at its outer rim to the valve plate. The attachment mechanisms include, but are not limited to: welding; bonding with adhesive; and mechanical clamping. In one embodiment, the space between the power spring membrane and the combustion chamber is filled completely with a hydraulic fluid. The hydraulic fluid couples the motion of the combustion chamber to the motion of the power spring membrane and vice versa.

As in FIG. 5, the ferromagnetic power spring membrane (160) serves as the "rotor" in a linear (as opposed to rotary) variable reluctance motor as follows. The switched reluctance generator housing (125) holds in place one or more concentric stator elements (310). Each stator element (310) comprises an annular unshaped channel made of ferromagnetic material, and filled with stator windings (300). These channels face towards the power spring membrane and are placed such that when the power spring membrane (160) is deflected upwards, as in FIG. 5a, the power spring membrane nearly makes physical contact with the stator elements (310). As the power spring membrane returns to a neutral position, a gap opens in the magnetic circuits, as in FIG. 5b. When the power spring membrane is deflected downwards, as in FIG. 5c, the gap is at its maximum displacement. Thus, the ferromagnetic power spring membrane (160) serves as a movable element in one or more magnetic circuits whose reluctance changes depending on the displacement of the power spring membrane. When the gap between the power spring membrane (160) and the stator elements (310) is very small, the reluctance in the one or more magnetic circuits through which magnetic flux flows (320) is reduced. The number of stator elements, the size of the channels, and the number and size of the wire windings, are chosen to match the electrical power generation capacity of the switched reluctance generator to the net power produced by the HCCI combustion. The size and thickness of the power spring membrane is chosen such that it has a primary radial resonant frequency that matches the desired operating frequency of the engine.

The invention includes a tuned intake and exhaust system aimed at reducing the amount of acoustic energy emitted from the operating engine, and in recovering heat from the exhaust to preheat the air/fuel mixture. The geometry of the intake and exhaust manifolds is chosen such that there is a primary acoustic anti-resonance at half the operating frequency of the engine (which, in a 4-stroke engine, is exactly the combustion frequency).

FIG. 6 shows an embodiment of a tuned intake and exhaust manifold subsystem (130), it includes a number of concentric passageways for intake (480) and exhaust (490), respectively. These passageways terminate in tapered holes (500) fabricated into the valve plate, thus matching the acoustic impedance between the intake and exhaust valve holes and the intake and exhaust manifolds. The length of the manifold (510) is chosen to be one quarter of the wavelength of the sound oscillation created by combustion. The interfaces between exhaust and intake passageways (520) serve as a surface in which exhaust heat is transferred to the intake fuel/air mixture, facilitating combustion. A rigid end cap (530) contains channeling necessary to admit the intake (30) and exhaust (40) ports to the concentric passageways for intake (480) and exhaust (490).

As in FIG. 2, the engine includes a heat removal actuator (190) which allows excess heat from combustion to be released to the external environment, or used to heat water or some other material, in order to maintain the correct operating temperatures of engine components. In an embodiment of the invention, suggested schematically in FIG. 2, the heat removal actuator is a fan for moving air over the engine/generator assembly. In another embodiment, the heat removal actuator (190) comprises a fluid pump and/or valve for moving a liquid coolant through a coolant manifold or jacket in the engine generator. Alternatively, the cooling system could be conduction based, in which the heat flow from the engine/generator housing to an external heat sink is controlled by a heat actuator (190) with variable thermal resistance.

An electronic control circuit and the embedded sensors and transducers allow the starting and subsequent control of the mechanical configuration and thermal state of the switched reluctance generator, power spring membrane, intake, and exhaust valve actuators and deformable combustion chamber. Such active control enables a low cost manufacturing process in which the Switched Reluctance Motor/Generator elements and housing need not be manufactured to the same tolerances as the deformable chamber. More importantly, active dynamic control allows the system to compensate for changes in the environment (e.g. temperature and ambient air pressure), and changes in fuel types and fuel composition.

FIG. 7 shows one embodiment of the various embedded sensors and their logical connection to the electronic control circuit (20). FIG. 8 shows an embodiment of the physical placement of these sensors in the described engine/generator. These sensors may be implemented with technologies other than the ones described below. The sensors may be placed in locations other than those shown in the attached figures in order to best measure local physical quantities. Sensors of different types may be used to indirectly determine the local physical quantities described herein. In addition, not all sensors may be required for operation of the engine.

Hydraulic Chamber Pressure Sensor (350)
Power Spring Membrane Deflection Sensor (360)
Hydraulic Chamber temperature sensor (370)
Fuel/Air Intake temperature sensor (380)
Exhaust temperature sensor (390)
Housing temperature sensor (400)
Exhaust oxygen sensor (410)
Intake hydrocarbon sensor (420)

In addition, as shown in FIG. 7, the electronic control circuit (20) provides actuation signals to the intake (440) and exhaust (450) actuators, and heat flow actuator (190).

In addition, as shown in FIG. 7, the electronic control circuit (20) is provided with a source of external power (60), used to start the internal combustion engine. When the engine (10) is running, the electronic control circuit (20) produces regulated electric power (50) based on the raw power from the Switched Reluctance Motor/Generator.

Note that whereas the wires and integrated metallization required for connecting the electrical sensors and the Switched Reluctance Motor/Generator windings to the electronic control circuit are not shown in the drawings of this description (to preserve clarity in the drawings), their existence is to be understood.

DESCRIPTION OF OPERATION

The system can operate in a four-stroke mode, with appropriate intake valve timing enabling operation over a range of expansion ratios relative to the compression ratio, allowing the engine to operate in a range between a pure Otto cycle (compression ratio equals expansion ratio) and an Atkinson cycle (compression ratio less than expansion ratio). In either mode of operation, two phases of the engine cycle are controlled: (1) the compression of the deformable combustion chamber; and (2) the opening of valves to admit the fuel/air mixture and to expel exhaust gases.

The deformable combustion chamber (20) compresses and decompresses and is driven by:

During starting by the Switched Reluctance Motor/Generator operating as a motor.

During self sustaining operation of the engine during the power stroke by the homogenous charge compression ignition (HCCI) of the air/fuel mixture.

During self sustaining operation of the engine during compression, exhaust, and inlet strokes, by the energy stored in the power spring membrane.

The deformation of the combustion chamber membrane is illustrated in FIGS. 3a-3d. FIG. 3a shows the configuration of the combustion membrane (120) at the point of maximum distension. FIG. 3b shows the neutral configuration of the combustion membrane. FIG. 3c shows the partially compressed combustion membrane. Note that the surface area exposed to the combustion chamber is reduced in this case because the combustion membrane (120) is in contact with the valve plate (200). FIG. 3d shows the combustion chamber at the point of maximum compression (and minimum volume). Note that as the combustion membrane is pressed into the cavity in the valve plate, not only does the volume of the combustion chamber diminish, but the internal surface area in contact with the combustion products diminishes as well.

As in FIG. 3, the power spring membrane oscillates in a resonant manner. Its resonance is driven:

During starting by an alternating electrical current applied to the switched reluctance motor/generator operating as a motor.

During self sustaining operation of the engine by the expansion of the combustion chamber during the power stroke following charge ignition via a hydraulic coupling between the combustion membrane and the power spring membrane.

As in FIG. 4a-4c, valves for admitting the fuel air mixture and for allowing exhaust gases to escape, while insuring very high compression of the air/fuel mixture for ignition, are fabricated into the valve plate (20). FIG. 4a shows a cross section through the annular valve membrane (260), the attachment to the valve plate (200), the actuating coils (270), the holes through which fluid flows when the valve is open (240), and the hard sealing surface (280). Each valve comprises an annular ring of ferromagnetic material which is attached at its outer periphery to the valve plate via a weld, flange, or other clamping mechanism. The annulus is flexible, and bends about the weld such that it is alternately in contact with the valve plate (the closed position), or deflected away from the valve plate and in towards the combustion chamber (the open position). The material and dimensions of this annulus are chosen such that the annulus is normally deflected upwards, into the combustion chamber. In the closed state, the valve membrane annulus covers a number of holes in the valve plate, thereby preventing the flow of fluid. To aid in sealing, the valve plate has a thin deposit of very hard material deposited in the area where the inner part of the valve membrane makes contact with the valve plate when the valve is closed. Note that when the valve is in its fully closed configuration, the surface comprising the valve membrane and the valve plate is a continuous, flat, polished surface, which makes contact with the combustion membrane as the combustion chamber is compressed.

As in FIG. 7, the electronic control circuit (20) controls the opening of these valves by varying the electrical current driving the valve windings. In an embodiment of the invention, the electronic control system can sense the relative opening of the valves by monitoring the reluctance of the windings.

4-Stroke Operation

FIG. 9 illustrates 4-stroke engine operation. The figure shows a cross section through the rotationally symmetric valve plate (200), combustion chamber membrane (120), and ceramic insert (210). The drawing also contains cross sections through the intake and exhausts valves, including the intake valve actuator windings (440), intake valve annular membranes (220), exhaust valve actuator windings (450), and exhaust valve annular membranes (230). The sequence of drawings shows the approximate timing of the engine cycle.

Intake Stroke: As illustrated in FIG. 9a, during the intake stroke the intake valves are open (220), while the exhaust valves (230) are closed. The fuel/air mixture (30) is drawn into the opening combustion chamber by negative pressure (relative to ambient) created in the expanding combustion chamber through the valve holes (240).

Compression Stroke: As illustrated in FIG. 9b, during the compression stroke, the intake valves (220) are closed, with the exhaust valves (230) remaining closed, causing the fuel/air mixture to be compressed as the volume in the combustion chamber decreases, and, ultimately to ignite (470) via compression ignition.

Power Stroke: As illustrated in FIG. 9c, during the power stroke, energy from the charge ignition (470) drives the combustion chamber open, imparting power, via the hydraulic fluid, to drive the resonance of the power spring membrane, for the next cycle, and providing net power for electrical output.

Exhaust Stroke: As shown in FIG. 9d, during the exhaust stroke, the exhaust valves (230) are opened, and the exhaust gases (40) are pumped out through valve holes (230) as the combustion chamber again compresses, leaving the combustion chamber empty (except for a residual amount of exhaust) for the beginning of the next intake stroke.

The mechanical resonance of the power spring membrane is used for operation as a 4-stroke engine. In this case, energy from the power stroke, in which combustion energy is imparted to the system, is stored to cause the oscillations for the subsequent exhaust, intake, and compression strokes, in which the engine itself produces no driving power from ignition.

Although multiple embodiments of the invention have been described, many variations and modifications will become apparent upon reading the present application.

What is claimed is:

1. A reciprocating internal combustion engine comprising:
   a deformable combustion chamber comprising a rigid valve plate with a conical shape, and a flexible membrane which is pressed into the valve plate, for creating compression ignition of a homogenous air/fuel mixture;
   a set of orifices in the rigid valve plate for allowing the passage of fuel/air mixture into the deformable combustion chamber and exhaust out of the deformable combustion chamber;
   one or more electronically actuated membranes in the rigid valve plate, which serve as valves to control fuel/air and exhaust mixture flow; and
   an electronic control mechanism responsive to embedded sensors in the engine for initiating a self-sustaining series of ignitions; controlling opening and closing of intake and exhaust valves; controlling the operating temperature of the engine; and compensating for variations in the mechanical configuration of the engine introduced during manufacturing and as a result of dynamic operation of the engine.

2. The engine of claim 1, wherein the engine is hydraulically coupled to an electric motor/generator for starting the engine, and for converting power from the chemical combustion of fuel to electrical power.

3. The engine of claim 1, wherein the material, geometry, and dimensions of the hydraulically coupled generator provide a primary resonant frequency in an axial direction which matches the operational frequency of the reciprocating engine.

4. The motor/generator of claim 3 implemented as a switched reluctance machine in which the hydraulic membrane also serves as the moveable element in one or more variable reluctance magnetic circuits.

5. A single combustion chamber, reciprocating, 4-stroke internal combustion engine operating with Homogeneous Charge Compression Ignition at or above 500 cycles per second.

6. The engine of claim 1, wherein the chamber has a low surface-area to volume "bowl" shaped cavity in the valve plate in which compression ignition occurs and in which said cavity is lined, or fabricated out of, a material with high thermal resistance.

7. The engine of claim 1 in which the intake valves are actuated such that the expansion ratio is greater than or equal to the compression ratio.

8. The engine of claim 1 with a tuned intake and exhaust system which serves to attenuate acoustic emissions, and to exchange heat between the (hotter) exhaust gases, and the (cooler) air/fuel mixture.

9. The engine and valve membranes of claim 1 in which the valve membranes have a resonant frequency which is approximately twice the operating frequency of the engine, in which they are normally partially open, and in which they can be pulled and held closed via an electromagnetic circuits.

10. The engine of claim 1 fabricated at millimeter scale and principally composed of Si, SiC and/or $Si_3N_4$.

\* \* \* \* \*